United States Patent
Hamann et al.

(10) Patent No.: US 8,360,697 B2
(45) Date of Patent: Jan. 29, 2013

(54) METHOD FOR REDUCING VIBRATIONS, WHICH OCCUR DURING A MACHINING PROCESS, OF A MACHINE ELEMENT AND/OR OF A WORKPIECE

(75) Inventors: Jens Hamann, Fürth (DE); Elmar Schäfers, Fürth (DE); Hans-Peter Tröndle, Forchheim (DE); Bernd Wedel, Möhrendorf (DE)

(73) Assignee: Siemens Aktiengesellschaft, München (DE)

( * ) Notice: Subject to any disclaimer, the term of this patent is extended or adjusted under 35 U.S.C. 154(b) by 582 days.

(21) Appl. No.: 12/095,232

(22) PCT Filed: Oct. 19, 2006

(86) PCT No.: PCT/EP2006/067575
§ 371 (c)(1),
(2), (4) Date: Jun. 15, 2010

(87) PCT Pub. No.: WO2007/060063
PCT Pub. Date: May 31, 2007

(65) Prior Publication Data
US 2010/0247261 A1    Sep. 30, 2010

(30) Foreign Application Priority Data
Nov. 28, 2005  (DE) .......................... 10 2005 056 603

(51) Int. Cl.
*B23C 9/00* (2006.01)
(52) U.S. Cl. .................. 409/131; 408/1 R; 409/141
(58) Field of Classification Search .............. 408/143, 408/8, 9, 5, 6, 1 R; 409/131–132, 141, 186, 409/187, 193–194, 231, 235; 188/378–380; 700/175, 279; 701/124; 73/460, 462
See application file for complete search history.

(56) References Cited

U.S. PATENT DOCUMENTS

| | | | | |
|---|---|---|---|---|
| 3,998,444 | A | * | 12/1976 | Stockwell ....................... 269/20 |
| 4,438,599 | A | | 3/1984 | Kamman |
| 4,817,003 | A | | 3/1989 | Nagase |
| 5,240,358 | A | | 8/1993 | Hackett |
| 5,494,269 | A | * | 2/1996 | McCalmont .................. 269/224 |
| 5,871,315 | A | * | 2/1999 | Burt et al. ..................... 409/225 |

(Continued)

FOREIGN PATENT DOCUMENTS

| | | |
|---|---|---|
| EP | 1 063 506 A2 | 12/2000 |
| EP | 1 621 285 A2 | 2/2006 |
| GB | 1179217 A | 1/1970 |
| JP | 5177495 A | 7/1993 |
| JP | 5272592 A | 10/1993 |
| JP | 08174370 A * | 7/1996 |

*Primary Examiner* — Daniel Howell
(74) *Attorney, Agent, or Firm* — Henry M. Feiereisen, LLC

(57) ABSTRACT

The invention relates to a method of reducing vibrations, occurring during a machining operation, of a machine element (7,8) and/or of a workpiece (5) in a machine tool, production machine and/or in a machine (1) designed as a robot, wherein an additional mass (9a, 9b, 9c) is attached to the machine element (7,8) and/or to the workpiece (5) in an automated manner, wherein the mass of the additional mass (9a, 9b, 9c) is adapted to the machining operation. Furthermore, the invention relates to a machine (1) in this respect. The invention enables vibrations, occurring during a machining operation, of a machine element (7,8) of a machine (1) and/or of a workpiece (5) to be reduced.

13 Claims, 1 Drawing Sheet

U.S. PATENT DOCUMENTS

| | | | |
|---|---|---|---|
| 6,236,934 B1 * | 5/2001 | Dyer et al. | 701/124 |
| 6,296,093 B1 * | 10/2001 | Norris et al. | 188/378 |
| 6,901,798 B2 * | 6/2005 | Trionfetti | 73/462 |
| 7,065,428 B2 * | 6/2006 | Baran et al. | 700/174 |
| 7,201,546 B2 * | 4/2007 | Ichino et al. | 409/165 |
| 7,462,093 B2 * | 12/2008 | Okanda | 451/28 |
| 7,503,735 B2 * | 3/2009 | Ando et al. | 409/141 |
| 8,157,252 B2 * | 4/2012 | Ladra et al. | 269/56 |

* cited by examiner

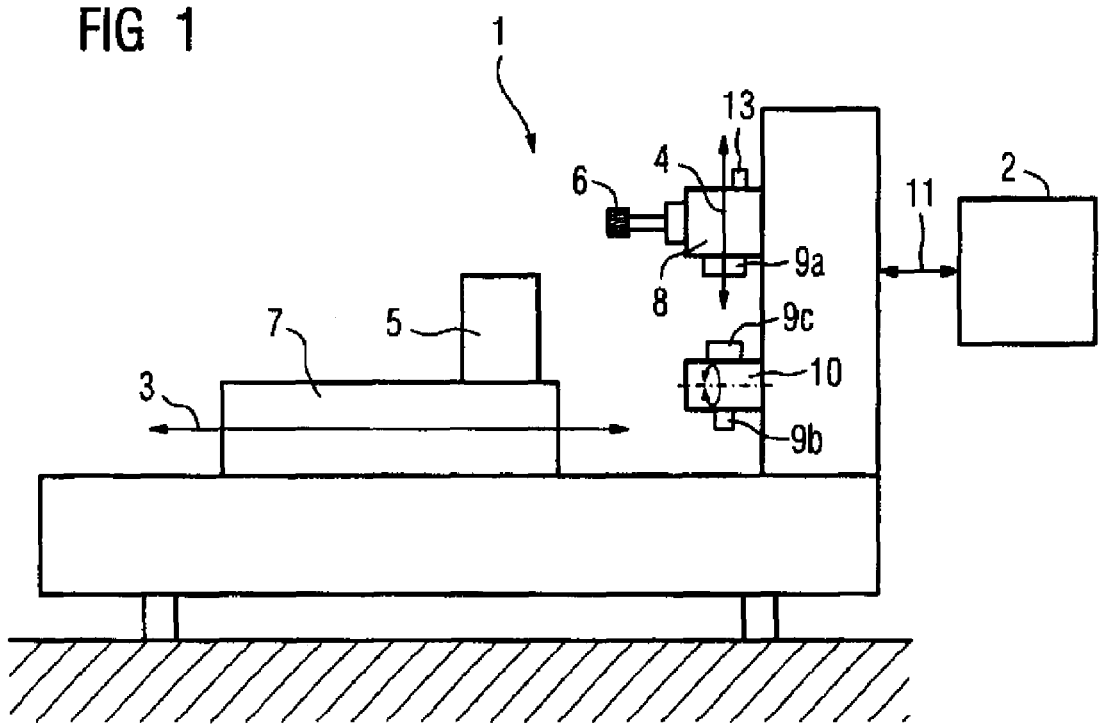
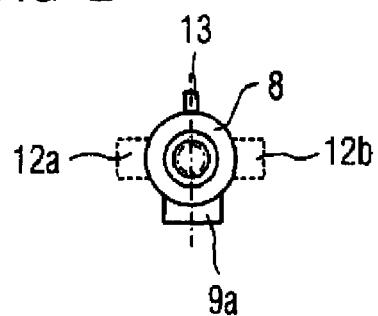

METHOD FOR REDUCING VIBRATIONS, WHICH OCCUR DURING A MACHINING PROCESS, OF A MACHINE ELEMENT AND/OR OF A WORKPIECE

BACKGROUND OF THE INVENTION

The invention relates to a method for reducing vibrations, which occur during a machining process, of a machine element and/or of a workpiece in a machine tool, production machine and/or in a machine which is embodied as a robot. The invention also relates to a machine of said type.

In machine tools, production machines and/or in robots, vibrations often occur during a machining process, in particular when large forces occur during the machining process, in the machine elements of the machine and/or in the workpiece.

In machine tools in particular, so-called chatter vibration occurs in the machine elements of the machine and/or in the workpiece as a result of the often-required intense chip removal in order to ensure short machining times of a workpiece to be machined. The vibrations have an adverse effect on the machining quality of the workpiece

SUMMARY OF THE INVENTION

The invention is based on the object of reducing vibrations, which occur during a machining process, of a machine element of a machine and/or of a workpiece.

Said object is achieved by means of a method for reducing vibrations, which occur during a machining process, of a machine element and/or of a workpiece in a machine tool, production machine and/or in a machine which is embodied as a robot, with an additional mass being attached in an automated fashion to the machine element and/or to the workpiece, with the mass of the additional mass being adapted to the machining process.

Said object is also achieved by means of a machine, with the machine being embodied as a machine tool, production machine and/or as a robot, with the machine having a machine element, with the machine being designed such that an additional mass is attached in an automated fashion to the machine element and/or to a workpiece, with the mass of the additional mass being adapted to the machining process.

Advantageous embodiments of the invention can be gathered from the dependent claims.

Advantageous embodiments of the invention are provided analogously to advantageous embodiments of the machine and vice versa.

It has proven to be advantageous if the additional mass is attached to the machine element and/or to the workpiece close to the machining process, since the vibrations of the machine element can then be reduced in a particularly effective manner.

It has also proven to be advantageous if the additional mass is attached symmetrically to the machine element and/or to the workpiece. By means of said measure, it is possible to prevent any tilting moments on the machine element caused by the additional mass.

It has also proven to be advantageous if the machine element and/or the workpiece have a gripper, a clamping device and/or a magnetic holder for attaching the additional mass. A gripper, a clamping device and/or a magnetic holder permit a simple attachment of the additional mass.

It has also proven to be advantageous if the attachment of the additional mass takes place by means of an automatic exchange device which permits the selection of a plurality of additional masses with different masses. By means of an exchange device, it is possible for a plurality of additional masses with different masses to be selected, and therefore for an additional mass which is optimized for the respective machining process to be attached to the machine element, in a simple manner.

It has also proven to be advantageous if a regulating parameter of the machine for the machining process is adapted to the mass of the additional mass. By means of said measure, it is possible to obtain particularly good machining quality.

It has also proven to be advantageous if the mass of the additional mass is adapted to the machining process in such a way that the mass of the additional mass increases with increasing actuating forces required for the machining process and/or with an increasing feed of the workpiece and/or of a tool. By means of said measure, an optimum reduction of vibrations is obtained.

It has also proven to be advantageous if, in the event of vibrations occurring, the machining process is automatically interrupted, the additional mass is attached and the machining process is subsequently automatically continued. Said measure permits an automatic reaction of the machine in the event of vibrations occurring.

It has also proven to be advantageous if, in the event of vibrations occurring, the additional mass is attached during the machining process. The overall machining time is shortened by means of said measure.

It has also proven to be advantageous if the mass of the additional mass is adapted to the machining process in such a way that the mass of the additional mass is selected as a function of a dominant frequency (for example cutting edge engagement frequency) of the vibrations. By means of said measure, an optimal reduction of vibrations can be obtained.

BRIEF DESCRIPTION OF THE DRAWING

An exemplary embodiment of the invention is illustrated in the drawing and is explained in more detail below. In the drawing:

FIG. 1 shows a machine tool according to the invention and

FIG. 2 shows one option for attaching the additional mass to the machine element.

DETAILED DESCRIPTION OF PREFERRED EMBODIMENTS

FIG. 1 illustrates a machine tool 1 in the form of a schematic illustration. The machine tool 1 has a control and/or regulating device 2, by means of which the machine tool 1 is controlled, with the control and/or regulating device communicating with the drives of the machine tool for this purpose, as indicated by a connection 11. The machine 1 has a drive 8 which drives a milling cutter 6. The drive 8 can be moved in the vertical direction, as indicated by an arrow 4, by means of a drive which is not illustrated in FIG. 1 for clarity. The machine 1 also has a workpiece holding device 7 into which a workpiece 5 is braced. The workpiece holding device 7 can be moved in the horizontal direction, as indicated by an arrow 3, by means of a drive which is not illustrated in FIG. 1 for clarity. Furthermore, the machine 1 has an exchange device 10 to which are fastened different additional masses which have a different mass in each case. These are the additional masses 9b and 9c in the exemplary embodiment.

If a machining process is now to be carried out, that is to say a milling process in the present exemplary embodiment, in which intense chip removal is desired and vibrations, in particular chatter vibrations, are to be expected on account of the high machining forces which occur, then according to the invention, in order to reduce the vibrations of a machine element which is present in the form of the drive 8 in the exemplary embodiment, an additional mass 9a is attached in an automated fashion to the drive 8 before the machining process. In order to attach the additional mass, the drive 8 is moved downward in the vertical direction in an automated fashion and picks up an additional mass in an automated fashion by means of the exchange device 10. In the illustration of FIG. 1, the additional mass 9a is already attached to the motor 8. The machine element and/or the workpiece can have a gripper, a clamping device and/or a magnetic holder for attaching the additional mass (9a,9b,9c), which are not illustrated in FIG. 1 and FIG. 2 for clarity.

As a result of the increased mass inertia of the machine element 8 by attaching the additional mass 9a, the vibrations which occur at the drive 8 are greatly reduced regardless of frequency.

Alternatively or in addition, the additional mass or a further additional mass can also be attached in an automated fashion to some other machine element, such as for example to the workpiece holding device 7 and/or directly to the workpiece 5. This can take place for example by means of a further exchange device which is not illustrated in FIG. 1 for clarity. The additional mass should preferably be attached to the machine elements and/or to the workpiece close to the machining process, since an attachment close to the machining process has the greatest effect with regard to the reduction of vibrations of the machine element or of the workpiece.

Here, the mass of the additional mass must be adapted to the machining process in such a way that said mass is of a sufficient magnitude to permit the reduction of vibrations. The mass of the additional mass should therefore preferably be adapted to the machining process in such a way that the mass of the additional mass increases with increasing actuating forces required for the machining process.

After the machining process which is associated with intense chip removal has ended, it is possible for a finishing machining process to follow. However, only small machining forces, and therefore also only small vibrations of the machine element and/or of the workpiece, generally occur in said finishing machining process. The finishing machining should however generally be carried out as quickly as possible, and therefore the machine axes of the machines, that is to say the workpiece holding device 7 and the drive 8 in the exemplary embodiment, should if possible be moved very quickly during the machining process. Here, the additional mass 9a, which has a relatively high mass, would have an interfering effect since it restricts the dynamics of the machine. Before the finishing process, therefore, the additional mass 9a is either exchanged by means of the exchange device 10 for an additional mass which has a lower mass, or the additional mass 9a is picked up by the exchange device 10 without a new additional mass being attached in an automated fashion to the drive 8.

As already explained above, the additional mass has an effect, depending on its mass, on the dynamics of the movement control of the machine axes of the machine 1. The greater the mass of the additional mass 9a, the slower the drive 8 can be moved in the vertical direction. It is therefore expedient for the regulating parameters of the machine for the machining process to be adapted to the mass of the additional mass in order to ensure an optimum machining process. It is therefore advantageous if the gain of the regulator (for example position regulator, speed regulator), which is responsible for the movement control of the additional mass 9a, within the control and regulating device 2 is reduced with increasing mass of the additional mass.

FIG. 2 shows a plan view of the drive 8 to which the additional mass 9a is attached. In the exemplary embodiment of FIG. 2, the additional mass 9a is attached symmetrically to the drive 8, with the line of symmetry being indicated by dash-dotted lines. As a result of the symmetrical attachment of the additional mass to the machine element, it is possible to prevent tilting moments, for example. Here, it is also possible, as indicated in the illustration of FIG. 2 by dashed lines, for the additional mass 9a to be divided into two sub-masses 12a and 12b, and for said sub-masses 12a and 12b to be attached to the drive 8 symmetrically at the left and at the right.

The additional mass of course need not necessarily be attached before the machining process; it is possible for the vibrations to be detected by the control and/or regulating device 2 for example by means of a vibration sensor 13 and/or by evaluating the drive currents of the drive 8, which control and/or regulating device 2 then interrupts the machining process and controls the attachment of the additional mass. The machining process is then continued. The attachment of the additional mass can however also be carried out during the machining process.

What is claimed is:

1. A method for reducing vibrations of a workpiece during a machining process of a machine, comprising the steps of:
    selecting a compensation mass having a mass suited to a machining process in dependence on a regulating parameter of the machine; and
    attaching the compensation mass in an automated fashion upon the workpiece.

2. The method of claim 1, wherein the machine is a member selected from the group consisting of machine tool, production machine, and robot.

3. The method of claim 1, wherein the compensation mass is attached upon the workpiece in close proximity to the machining process.

4. The method of claim 1, wherein the compensation mass includes sub-masses attached in symmetry upon the workpiece.

5. The method of claim 1, wherein the attaching step is realized by a member selected from the group consisting of gripper, clamping device, and magnetic holder with the member being associated to the workpiece.

6. The method of claim 1, wherein the attaching step is realized by means of an automatic exchange device which permits a selection of a plurality of additional compensation masses with different masses.

7. The method of claim 6, wherein the selecting step includes the step of matching a compensation mass of increased mass as an actuating force required for the machining process increases and/or a feed of the workpiece and/or a tool increases.

8. The method of claim 1, further comprising the step of automatically interrupting the machining process in the presence of vibrations before carrying out the selecting and attaching steps, and automatically continuing the machining process after the selecting and attaching steps.

9. The method of claim 1, wherein the attaching step is implemented during the machining process.

10. The method of claim 1, wherein the selecting step includes the step of selecting the compensation mass as a function of a dominant frequency of the vibrations.

11. A machine for reducing vibrations of a workpiece during a machining process, comprising:
    a compensation mass having a mass adapted to a machining process of the machine in dependence on a regulating parameter of the machine; and
    an automatic exchange device to detachably secure the compensation mass in an automated fashion to the workpiece.

12. The machine of claim 11, embodied as a machine tool, production machine and/or robot.

13. The machine of claim 11, further comprising a member selected from the group consisting of gripper, clamping device, and magnetic holder, with the member being associated to the workpiece.

* * * * *